Patented Mar. 6, 1923.

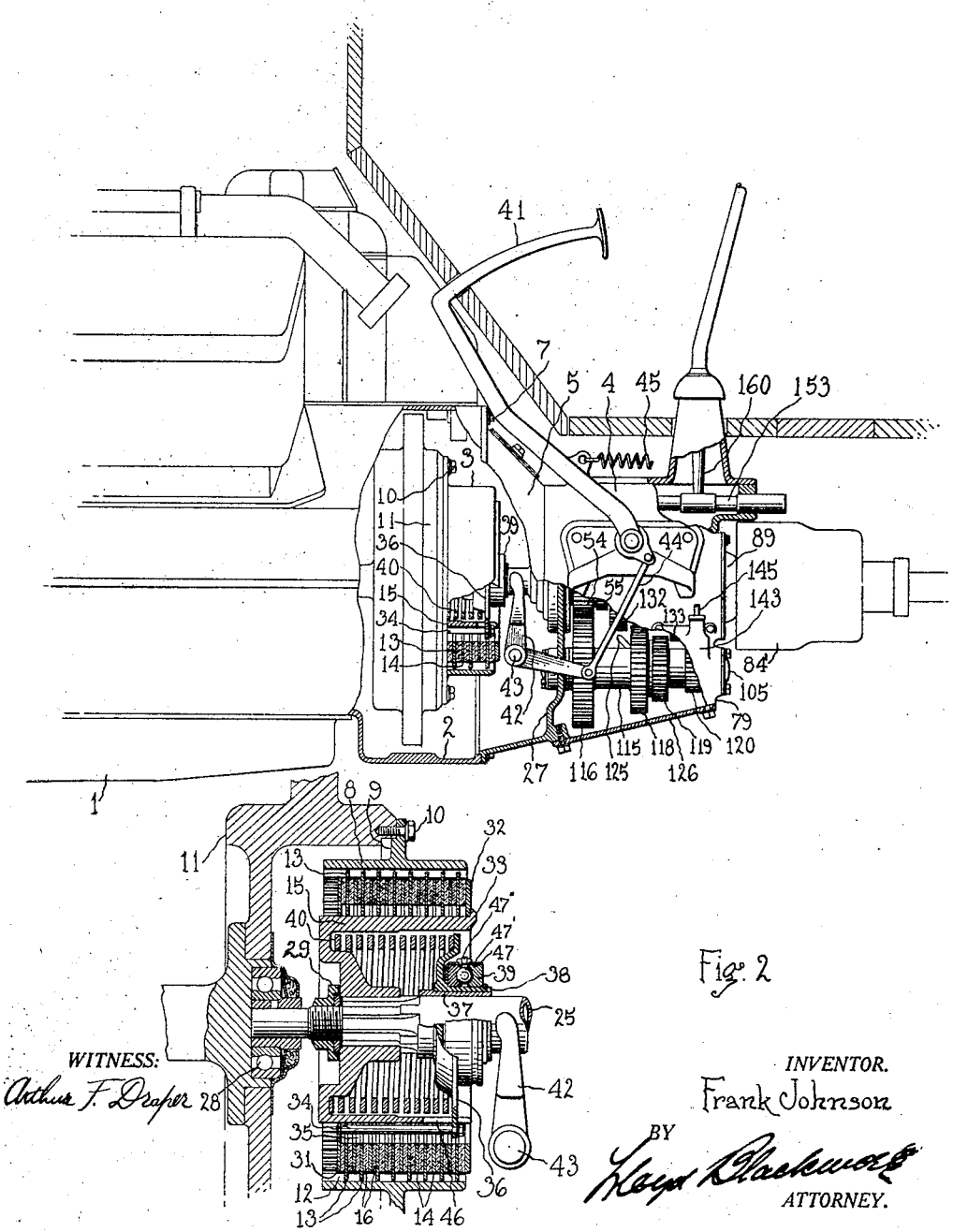

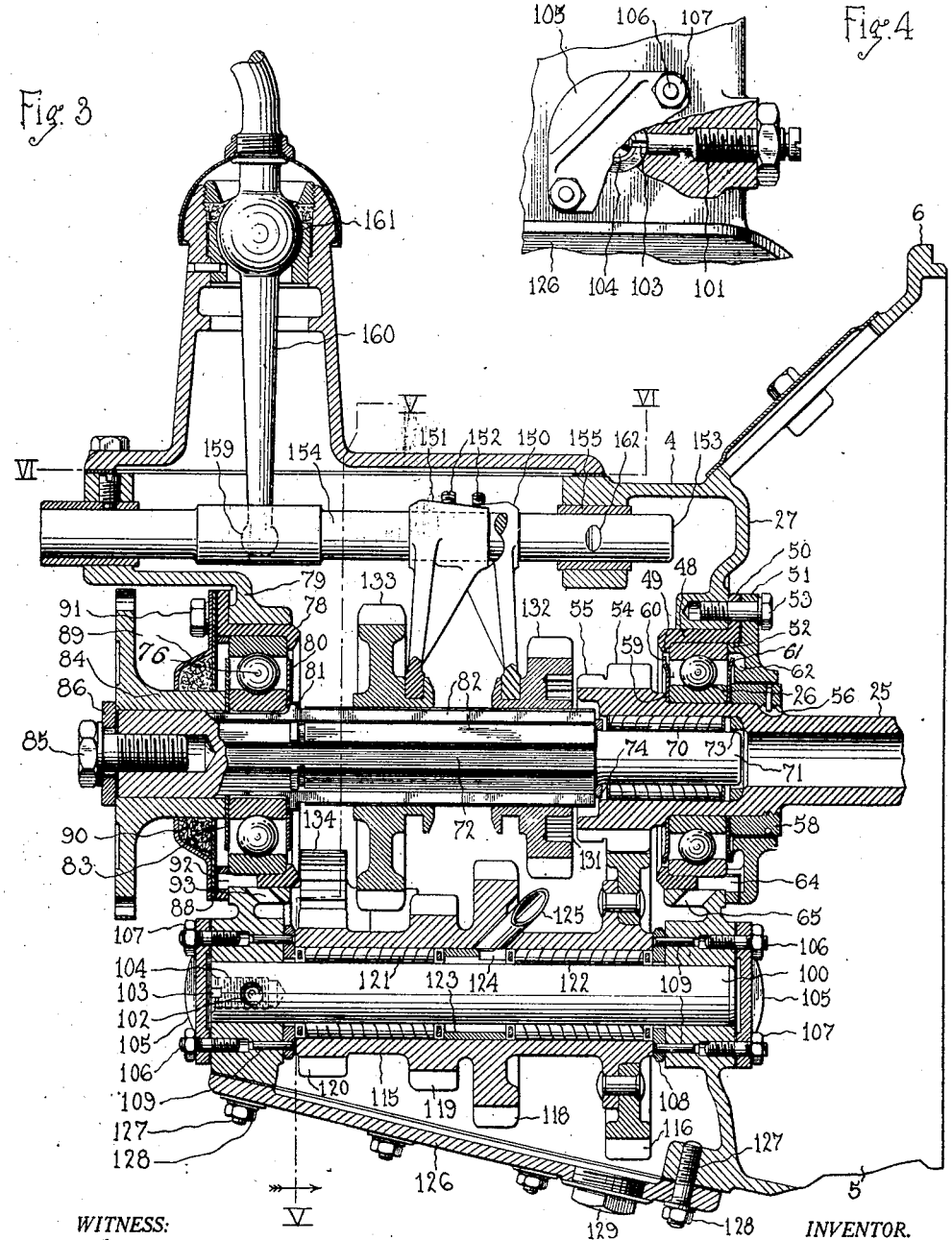

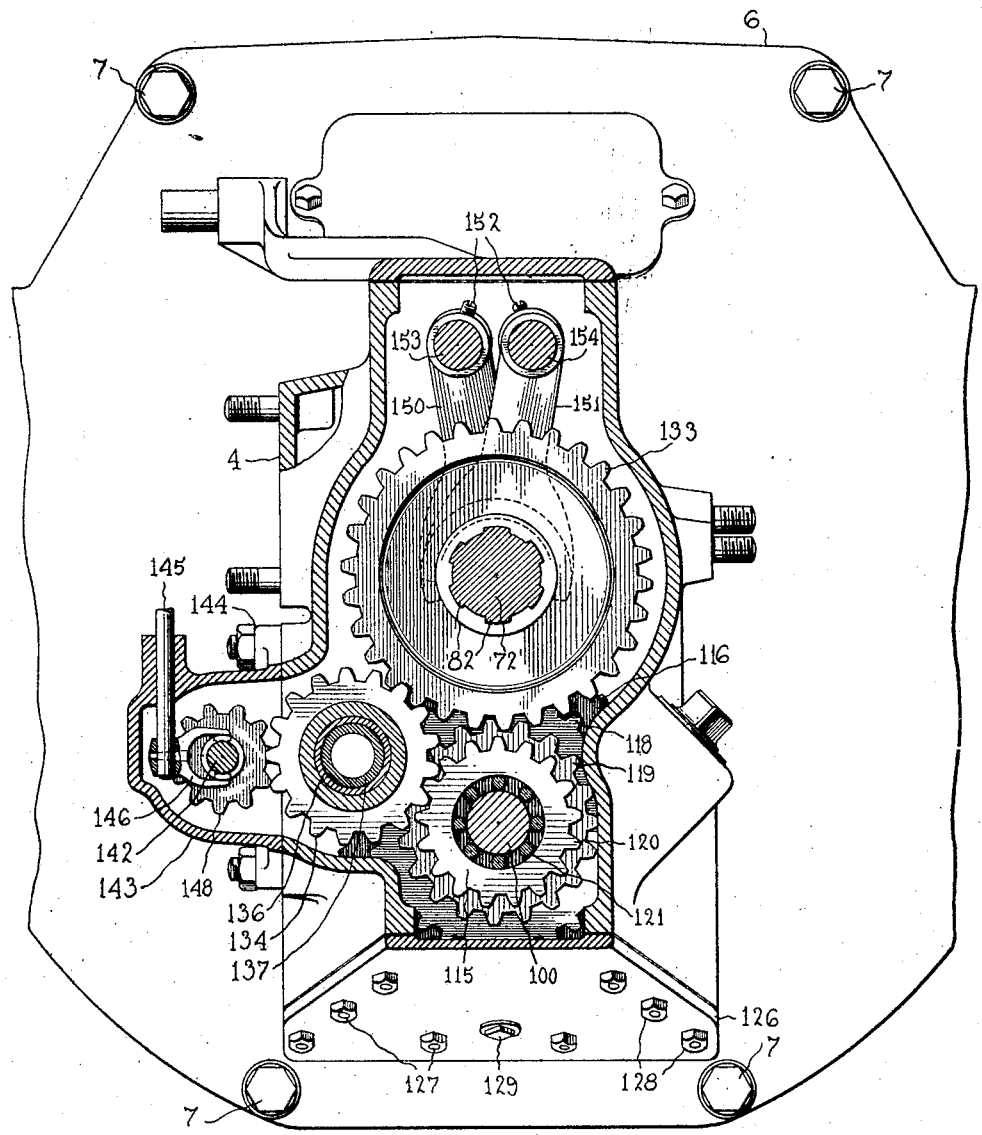

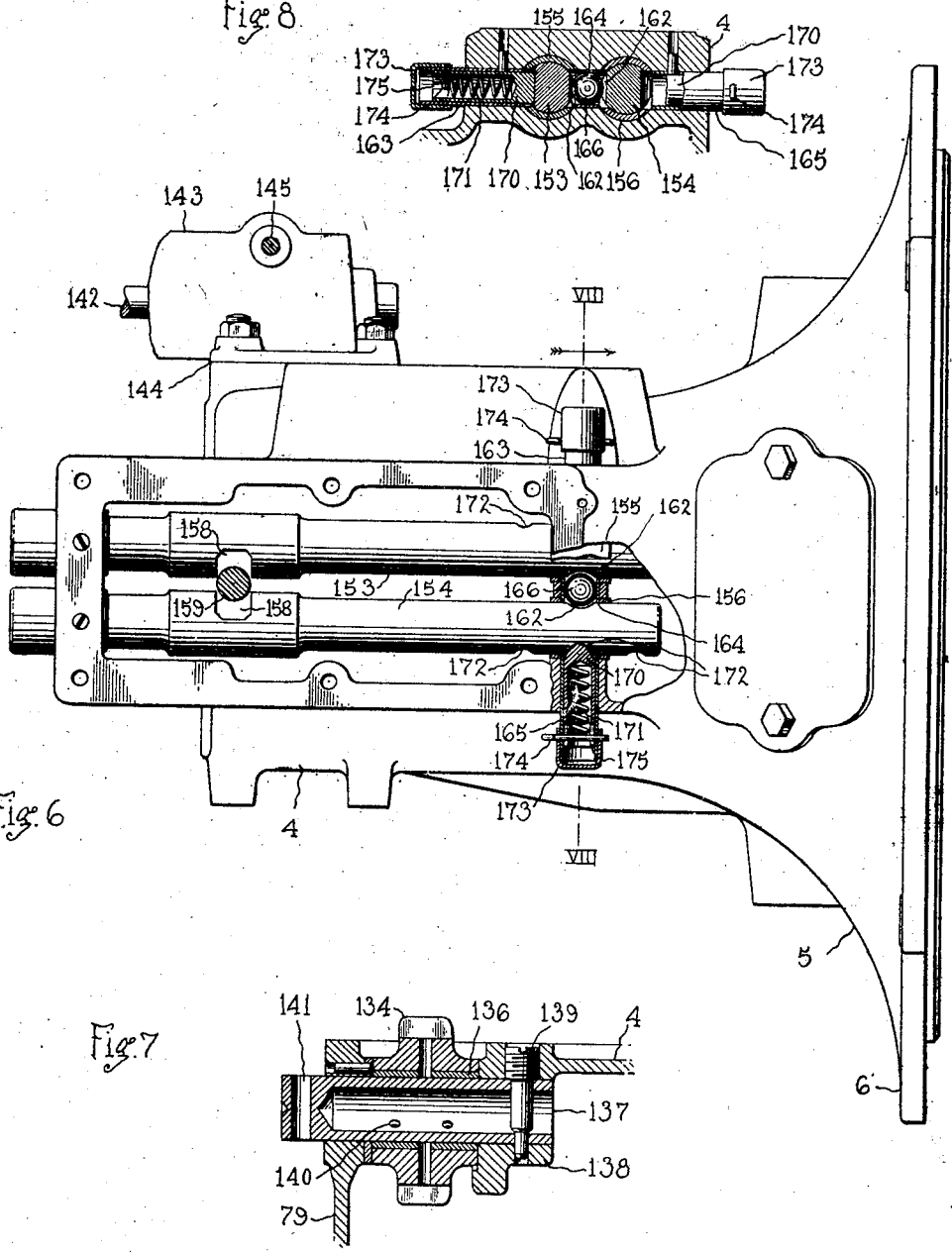

1,447,856

UNITED STATES PATENT OFFICE.

FRANK JOHNSON, OF DETROIT, MICHIGAN, ASSIGNOR TO GENERAL MOTORS CORPORATION, OF DETROIT, MICHIGAN, A CORPORATION OF DELAWARE.

MOTOR VEHICLE.

Application filed July 18, 1918. Serial No. 245,471.

*To all whom it may concern:*

Be it known that I, FRANK JOHNSON, a citizen of the United States, and resident of Detroit, Wayne County, State of Michigan, have invented certain new and useful Improvements in Motor Vehicles, of which the following is a specification.

The present invention relates primarily to transmission mechanism for motor vehicles.

One of the main objects of the invention is to materially reduce the distance which the speed changing mechanism overhangs the engine casing, at the same time retaining a disc clutch as the driving element. This is accomplished by so constructing the clutch barrel that the thrust collar or bearing, whereby the operating force is transmitted to the clutch spring, is receivable therein. The front wall of the casing for the speed changing gears may thus be positioned closer to the rear face of the clutch than has been possible heretofore.

Another important feature resides in a mounting for the countershaft gear whereby it may be readily removed from the casing without disturbing other parts.

The invention also consists in a counter shaft and counter shaft gear construction wherein the shaft is removable from the casing by a longitudinal movement along its own axis and wherein the countershaft gear may thereafter be removed downwardly through an opening in the bottom of the casing.

The invention further consists in improved gear shifting means whereby a proper interlocking action with reference to the gear shifts is insured.

Another feature of the invention resides in a scoop carried by the countershaft gear and arranged to constantly supply oil to the bearings for said gear.

The invention also consists in a transmission casing wall having an open bearing therein, said bearing including a cage and an oil flinging disc or flange arranged to direct oil which has passed through the bearing off into an annular groove in the cage, whereby the oil is returned to the reservoir in the casing.

The invention further consists in a change speed gear casing substantially corrugated in transverse cross-section on lines that approximately conform to the several gears therein. This construction is advantageous in that it results in increased strength, is neat and compact, requires a minimum amount of oil (inasmuch as the gears act more readily as oil pumps) and does away with the noise incident to ordinary drum shaped casings.

Again, the invention consists in a change speed gear casing having integral therewith a forwardly flaring wall arranged to be bolted to the engine casing to form a closed chamber for the clutch. Besides being stiffer and less subject to vibration, this one-piece casing construction presents fewer joints, requires less machining, is less subject to leakage, has the advantage of unit assembly, more readily holds the bearings in proper relative alignment, and is lighter and shorter than ordinary casings. It will be noticed that there is but a single joint between the change speed gear casing and the engine casing, that is, that there is no interposed member, and that this joint is at a point where packing is not necessary. Therefore the dis-alignment which might result from the use of packing is avoided.

The invention also consists in certain other details of construction shown, described and claimed.

In the drawings, Fig. 1 is a side view, parts being broken away, showing the general arrangement of parts. Fig. 2 is an enlarged vertical section showing the clutch construction more clearly. Fig. 3 is a central longitudinal vertical section through the speed changing mechanism. Fig. 4 is a fragmentary rear elevation, parts being broken away, showing the countershaft retaining screw. Figs. 5 and 6 are sections on the lines 5—5 and 6—6, respectively, of Fig. 3. Fig. 7 is a central horizontal section, showing the mounting of the reversing idler gear. Fig. 8 is a section on the line 8—8 of Fig. 6, parts being omitted.

The general arrangement of parts is indicated in Fig. 1, wherein 1 designates the engine casing having a rearward extension 2 by which the clutch 3 is for the most part enclosed. The change speed gear casing 4, preferably of aluminum, has a flaring front end 5 flanged circumferentially at 6 and attached to the engine casing by screws 7, said end being arranged to enclose a portion of the clutch.

The latter is of the disc type and includes a cage 8 having at a point preferably intermediate in its length, an annular flange 9 whereby it may be bolted as at 10 to the fly wheel 11. Slidable in the cage, but constrained to turn therewith by splines 12, are the metal discs 13 that alternate with other discs 14 which are in turn slidable along but constrained to rotate with a hollow barrel 15. One set of the discs,—as shown, the discs 13—is faced with friction material 16.

The hollow clutch shaft appears at 25, its rear end being mounted in an antifriction bearing 26, Fig. 3, the housing or cage of which is carried in a boss on the cross wall 27 of the casing 4, and its front end being supported in a bearing 28 carried by the flywheel. A nut 29, threaded on the clutch shaft, receives the longitudinal thrust, and splines cause the shaft to turn with the barrel 15. It will be seen that the barrel is provided with the front and rear end plates 31 and 32, both splined thereon, and that the latter is seated against an abutment 33 whereas the former has fixed thereto a series of bolts 34 which pass through slots 35 in the discs 13 and 14 and are fixed to a spider 36 at the rear end of the clutch. The spider preferably includes a bushing 37 and is extended rearwardly to form a tubular portion 38 upon which a thrust bearing or collar 39, preferably of the ball type, is mounted. A spring 40, housed in the barrel, tends to force the spider to the right (Fig. 2) and normally holds the sets of discs tightly together. When pressure is applied to the foot pedal 41 (Fig. 1), it is evident that the yoke 42 is swung counter-clockwise about its pivot 43 by means of the link 44 and moves the spider forwardly, thereby overcoming the spring 40 and setting the clutch discs free from one another. The yoke is normally held free or spaced from the collar 39 by means of a spring 45 (Fig. 1), thus eliminating wear.

It will be particularly noted that the inner diameter of the barrel is greater than the outer diameter of the collar or thrust bearing 39, from which it follows that the latter, as well as the spider (the arms of which are received in slots 46 in the barrel), is adapted to enter the barrel and may be positioned, in whole or in part, forwardly of the rear face thereof. The distance between the engine casing and the cross-wall 27 is thus materially lessened as compared with the corresponding dimension in the event the collar 39 were of larger diameter than the internal diameter of the barrel, and the leverage of the heavy overhanging speed changing mechanism, in respect to the engine casing, is appreciably reduced. The saving of space is also advantageous. A further material reduction in length is secured by depressing the central portion of the spider forwardly within the spring 40, as shown in Fig. 2.

The races of the collar 39 are preferably enclosed by a sheet metal stamping 47 that is turned inwardly along the front face of the front race and has its rear margin spun into a circumferential groove at 47' in the rear race. The plug 47'' being removed, the bearing may be oiled, as is obvious.

The bearing 26 and cage construction corresponding thereto possess novel features, and the cage includes a tubular member 48 having an inner flange or shoulder 49 and an outer flange 50, and a second or outer member 51 having a flange 52 that fits into the member 48 and bears against the outer race of the bearing to force the latter against the shoulder 49 when the set screws 53 are tightened. It will be seen that the rear end of the shaft 25 forms a spur gear 54 and clutch jaws 55, and that the shaft is threaded at 56 to receive a nut 58 whereby the inner race of the bearing 26 is clamped against a shoulder 59 of the gear. Interposed between the gear and the inner race of the bearing is a dished metal disc 60, and a similar disc 61 is positioned between the inner race and the nut 58. The discs substantially overlap the outer race but are spaced slightly therefrom, and the disc 61 may be said to overlap an annular passage or groove 62 in the inner face of the housing member 51.

In operation, the disc 60 prevents the entrance of foreign material, such as pieces of metal chipped from the gears, into the bearing, and also throws off oil in excess of that required for proper lubrication of the bearing. Such quantities of oil as reach the front end of the bearing are thrown by the disc 61 out against the outer wall of the groove 62 and follow the wall of the latter radially inwardly and circumferentially to the bottom, where they are delivered back into the casing through the passages 64 and 65 in the member 48 and in the boss on the cross-wall 27. A constant and non-excessive circulation of the oil is thus insured through the main bearing, and waste is prevented.

The member 25—54—55 is hollowed out to receive a roller bearing 70 in which the reduced forward end 71 of the main shaft 72 is carried, said bearing being held in proper position by the spacing rings 73 and 74. At its rear end, the shaft 72 is supported in a bearing 76 similar to the bearing 26. The cage member 78 for this bearing is also similar to the member 48 and is supported in the rear wall 79 of the casing in the same general way as described with reference to the former and the wall 27. In this instance, however, the inner disc 80, which corresponds to the disc 60, is interposed between the inner ball race and the lugs 81 that are left after cutting splines 82 on the shaft 72. The outer disc 83, corresponding to the disc 61, is interposed between the inner ball race and an internally splined tubular member 84 to which a universal joint structure 84' (Fig. 1) is attached. When the cap screw 85 is tightened, the washer 86, pressing on the member 84, clamps the discs and inner ball race firmly against the lugs 81. The outer end of the bearing cage is sealed by the sheet metal ring 88 and cupped retainer 89 between which the packing 90 is received, the retainer, ring and member 78 being held to the casing wall 79 by cap screws 91.

In use, the excess oil is thrown off from the disc 80 and foreign material is excluded thereby as in the case of the disc 60. The small amount of oil that works through the bearing is finally discharged back into the casing through passages 92 and 93, similar to the passages 64 and 65.

Arranged preferably directly below the shaft 72 is a non-rotatable counter shaft 100, the ends of which are carried in bosses on the walls 27 and 79. Various means may be employed to prevent the shaft from turning, that shown consisting in a cross-pin 101 (Fig. 4) threaded into the casing and having its end received in a hole 102 (Fig. 3) in the shaft. By slotting the end of the shaft as at 103 a tool may be applied to turn it angularly to properly enter the pin 101 in the hole 102; and by tapping and threading the shaft as indicated at 104 a threaded tool may be screwed in to withdraw the shaft bodily. Covers 105, held in position by studs 106 and nuts 107, prevent the escape of oil. As the casing is preferably of aluminum, it is desirable to provide hardened thrust collars 108 that may be fixed to the casing by dowels 109 inserted through the same holes as the studs.

Supported on the countershaft is a stepped or quill gear 115 having teeth 116 constantly in mesh with the teeth 54. This gear also includes the intermediate speed teeth 118, the low speed teeth 119 and the teeth 120 for reversing. Evidently, these three sets of teeth might be separate from the barrel of the gear, as are the teeth 116. The gear 115 rides on roller bearings 121 and 122 between which a spacer 123 is interposed. The spacer is pierced at 124 in registration with the inner end of a tubular oil-scoop 125, the outer end of which scoops up oil from the casing at each turn and directs it by gravity into the space between the ends of the bearings, thus maintaining the latter properly lubricated at all times.

It will be seen that the lower side of the casing has an opening which is closed by the cover 126 held in place by studs 127 and nuts 128. Upon removing the cover and after pulling the shaft 100 out from the casing as heretofore described, the quill gear 115 may be taken out through the opening. A plug 129 in the cover is provided for drainage.

The main shaft has slidable thereon a clutch gear having jaws 131, adapted to cooperate with the jaws 55, and the teeth 132 adapted to engage the teeth 118. When the gear 131—132 is in the position shown, the shaft 72 is stationary; when the jaws 131 and 55 are in engagement, the shaft 72 is driven forwardly at high speed; and when the teeth 132 mesh with the teeth 118 the intermediate forward speed is secured. Also slidable on the main shaft is a gear 133 that engages the teeth 119 for low speed, the gear 131—132 then being in the position shown. To reverse, the gear 133 is shifted to the rearward limit of its movement, where it meshes with the idler gear 134 (Fig. 5) that is, in turn, in mesh with the teeth 120.

The idler gear 134 may be supported in various ways, but it is preferred to provide it with a hardened bushing 136 (Fig. 7) that turns on a hollow shaft 137, the latter being carried by the wall 79 and the boss 138. A screw 139 passes through the shaft and prevents the latter from turning, but does not prevent oil from running into the shaft and being distributed through the holes 140 to the bushing 136. By allowing the shaft to project from the wall 79 and by perforating it transversely at 141, a tool may be readily applied to withdraw it when the screw 139 is removed.

If desired, a pump shaft 142, parallel to the idler shaft, may be mounted in a casing section 143 (Fig. 5) which is bolted to the rest of the casing at 144 and laps over the head of the screw 139. A shaft 145 and yoke 146 provides means for shifting the pump gear 148 into or from mesh with the idler gear, it being understood that the pump gear is keyed to its shaft.

The gears 131—132 and 133 may be shifted along the shaft 72 by any suitable means, say by the yokes or fork arms 150 and 151. In order, however, to secure the proper interlocking action, the arms are themselves respectively fixed as by means of set screws 152 to the shifter shafts 153 and 154 that are arranged parallel to each other in bushings 155 and 156 carried by the casing. The shafts are provided with complementary notches 158, in either one of which the head 159 of the shifter lever 160 (mounted for universal swinging movement at 161) is adapted to be received. The shafts are also notched at 162 and the upper wall of the casing is bored out (Figs. 6 and 8) to receive three aligned bushings 163, 164 and 165. The bushing 164 supports a ball 166, and the depth of the notches 162 is such that the ball may shift to clear either one or the other but not both. That is, it is possible to shift but one of the rods 153 and 154 at a time, and that only when the notch in the other shaft is opposite the ball; in other words, the gears 131—132 and 133 must be in the neutral positions shown in Fig. 3 before either gear can be shifted in either direction. Tubular detents 170, bored out to receive the springs 171 and arranged to be received in either one of a set of three notches 172 in the corresponding shifter shaft, are adapted to hold said shafts in the three positions of the corresponding movable gear; and pressed metal caps 173, pin-connected to the bushings at 174, exclude dirt. The detents 170 are slotted at 175 to allow the necessary movement relatively to the pins 174.

It will be observed—see particularly Fig. 5—that the transverse cross-section of the casing is made up of a series of corrugations or ribs those at the top and bottom having approximately right angle corners in the embodiment shown. In other words, the sides of the casing are contracted in the portion above the main shaft gears, are expanded in the vicinity of these gears into a longitudinal corrugation conforming to the periphery thereof, are again contracted, as shown, below the main shaft gears, forming an inwardly extending longitudinal corrugation, and again expanded in the vicinity of the countershaft gears. These corrugations conform rather closely to the gears; besides the resulting reduction in size, the vibration and rumbling sounds incident to the operation of change speed gearing in ordinary box or drum casings is very materially reduced. A better lubricating action is also secured with less oil on account of the fact that the gears act more readily as oil pumps. The flaring of the forward end of the casing 4, as is best indicated by Fig. 6, also greatly stiffens the construction.

The actual details of the various novel features of the invention may be widely varied without departing from the spirit of the invention, and I do not, therefore, wish to be limited except as indicated by the subjoined claims.

I claim:

1. Speed changing mechanism comprising a casing, a driven shaft rotatable therein, a countershaft mounted in said casing below said driven shaft, and gearing on said countershaft arranged to drive said driven shaft at any one of a plurality of speeds, the lower portion of said casing being removable, and said parts being so constructed and arranged as to permit the removal of said gearing downwardly away from said driven shaft.

2. Speed changing mechanism comprising a gear casing having a main portion and a detachable bottom portion, axially aligned driving and driven shafts rotatably mounted in said main portion, a countershaft supported below said driving and driven shafts, and gearing on said countershaft arranged to be driven from said driving shaft and to drive said driven shaft selectively at different speeds, said parts so constructed and arranged as to permit the removal of said gearing downwardly from said main casing portion and away from said driving and driven shafts without disturbing the latter.

3. Speed changing mechanism comprising a casing, a main shaft rotatable therein, a countershaft at a lower level than the main shaft, gearing whereby the main shaft may be driven from the countershaft, the casing having an opening in alignment with the countershaft and also having an opening in its bottom between the ends of the countershaft, detachable cover means for the openings, the countershaft being removable through the first named opening and the countershaft gearing being thereafter removable through the last named opening after the cover means is removed.

4. In a change speed gearing, a casing, a countershaft supported therein, the casing including a removable cover registering with one end of the countershaft, said end of the countershaft being tapped to receive a threaded tool whereby it may be withdrawn by a movement longitudinally of its own axis when the cover is removed.

5. In a change speed gearing, a casing, a countershaft therein, said casing having an opening in alignment with the countershaft, a removable cover for said opening, and a removable cross-pin intersecting the casing and the countershaft whereby the latter is prevented from rotating, said countershaft being removable through the opening.

6. In a change speed gearing, a casing, a countershaft supported therein, means for preventing the countershaft from turning in the normal operation of the gearing, the casing including a detachable cover plate registering with one end of the countershaft, the corresponding end of the countershaft being slotted to receive a tool whereby the countershaft may be turned angularly to facilitate assembling the latter in the casing.

7. In a change speed gearing, a casing of soft material such as aluminum, a countershaft mounted therein and fixed against rotating, a rotatable gear on the countershaft, and a hardened collar surrounding the countershaft and fixed to the casing on the inner surface thereof for receiving end thrusts of the gear.

8. In a change speed gearing, a casing of relatively soft material, a gear rotatably mounted therein, the casing including a detachable cover plate in alignment with the axis of the gear, studs for retaining the cover plate in position, a hardened collar for receiving end thrusts of the gear, and dowels inserted through the openings in which the studs are received, for preventing the collar from turning.

9. In combination, a shaft, a quill gear rotatable thereon, spaced bearings interposed between the gear and the shaft, scoop means carried by the gear and adapted to dip into lubricating fluid and deliver said fluid into the space betweeen the bearings.

10. In combination, a shaft, a gear rotatable thereon, bearings interposed between the gear and the shaft, a spacer interposed between the bearings, scoop means carried by the gear and registering with the spacer, whereby lubricating fluid may be delivered between the bearings as the gear rotates.

11. In combination, a shaft, a gear rotatable thereon, spaced bearings for the gear, and a single scoop carried by the gear and adapted to dip into lubricating fluid as the gear turns, the parts being so constructed and arranged that the scoop delivers lubricating fluid to both bearings.

12. In a change speed gearing, a fixed countershaft, a casing in which the countershaft is mounted, a quill gear rotatable on the countershaft, and scoop means carried by the gear at an intermediate point in the length thereof, said scoop means being arranged to dip into lubricating oil in the casing and deliver it between the gear and the countershaft to properly lubricate the gear.

In testimony whereof I affix my signature.

FRANK JOHNSON.